(12) United States Patent
Madar

(10) Patent No.: US 8,941,964 B2
(45) Date of Patent: Jan. 27, 2015

(54) ELEVATOR PROTECTION AGAINST SHORT CIRCUIT OF SAFETY DEVICES

(71) Applicant: Yoram Madar, Rishon Lezion (IL)

(72) Inventor: Yoram Madar, Rishon Lezion (IL)

( * ) Notice: Subject to any disclaimer, the term of this patent is extended or adjusted under 35 U.S.C. 154(b) by 6 days.

(21) Appl. No.: 13/988,594

(22) PCT Filed: Nov. 22, 2012

(86) PCT No.: PCT/IL2012/000379
§ 371 (c)(1),
(2) Date: May 21, 2013

(87) PCT Pub. No.: WO2013/084218
PCT Pub. Date: Jun. 13, 2013

(65) Prior Publication Data
US 2014/0247531 A1 Sep. 4, 2014

(30) Foreign Application Priority Data

Dec. 8, 2011 (IL) .......................................... 216841

(51) Int. Cl.
*H02H 3/08* (2006.01)
*B66B 5/00* (2006.01)

(52) U.S. Cl.
CPC ................ *H02H 3/08* (2013.01); *B66B 5/0031* (2013.01)
USPC ...................................................... 361/93.1

(58) Field of Classification Search
USPC ......................................................... 361/93.1
See application file for complete search history.

(56) References Cited

U.S. PATENT DOCUMENTS

| 5,721,403 | A | * | 2/1998 | Hoppie et al. | ................. 187/391 |
| 2007/0284195 | A1 | | 12/2007 | Roschier et al. | |
| 2014/0117777 | A1 | * | 5/2014 | Rees et al. | ..................... 307/115 |

FOREIGN PATENT DOCUMENTS

CN 201193171 2/2009

* cited by examiner

*Primary Examiner* — Jared Fureman
*Assistant Examiner* — Kevin J Comber
(74) *Attorney, Agent, or Firm* — Law Offices of Steven W. Weinrieb

(57) ABSTRACT

An electrical safety circuit powered by an electrical power supply at point A terminal, the safety circuit includes a plurality of switches serially connected to one another, the serially connected switches have a first and second ends, the first end is connected serially to the power supply and the second end is serially connected to a safety circuit bypass detector having two ends, one end of the safety circuit bypass detector is connected serially to the second end of the serially connected switches and the second end of the safety circuit bypass detector is connected to a point B terminal, the point B terminal is connected to an electrical load. The safety circuit bypass detector have a switching device RX with a normally open contact RX1 and a normally close contact RX2, a switching device RZ with a normally open contact RZ1 and a normally open contact RZ2.

24 Claims, 4 Drawing Sheets

ELEVATOR PROTECTION AGAINST SHORT CIRCUIT OF SAFETY DEVICES

FIELD OF THE INVENTION

The present invention relates to elevator safety circuit bypass and more particularly a system for preventing accidents resultant from elevator safety circuit bypass.

BACKGROUND OF THE INVENTION

The elevator is a type of vertical transport equipment that efficiently moves people or goods between floors (levels, decks) of a building, vessel or other structures. Automatic elevator car systems, i.e., systems in which the car door automatically opens when the car reaches a floor and close before the car leaves a floor, are well-known in the art. Elevator car landing doors protect passengers and unauthorized persons from falling into the elevator shaft.

Elevator systems further include a set of landing doors which are kept locked on each floor to prevent unauthorized person access into the elevator shaft at all time, and protect them from falling into the shaft. In automatic elevator car systems, the landing door may be automatically opened and closed or may be manually opened and closed. The door is unlocked and opened by a machine preferably sitting on the roof of the car, which also drives the doors that travel with the car. Door controls are provided to close immediately or reopen the doors. A control means is provided for moving the car from one of the floors to another, stopping the car at a floor, causing opening and closing the elevator doors at a floor at which the car is stopped.

Elevator systems usually includes a switch or switches operable when the landing door is closed and a switch or switches operable when the car door or gate is closed which permits the car hoisting apparatus to move the car to another floor when all switches have been operated in closed state. Also, such systems usually include a mechanical locking device which prevent opening of the doors unless the car is substantially level with the floor at which the doors control entrance and egress from the car. The plurality of switches on the car and at the floors which are connected to the control means, when all the doors are closed and locked, permit operation of the circuits in the control means which cause the car to move. Usually included in such plurality of switches are, a switch at each floor controlled in accordance with the position of the car door and operated by the locking mechanisms which hold the doors closed until the locking mechanisms are automatically released when the car is at a floor.

Elevators incorporate several safety features to ensure safe operation of the elevator. However, elevators from time to time, require service and maintenance. When elevator mechanics are conducting inspection and maintenance of the elevators, it is often necessary to use a short stub to short circuit/bypass a certain section of the elevator safety circuit to facilitate installation, debugging, or detection of problems. Using a jumper which is a short length of conductor used to bypass a section of elevator safety circuit. Some switches can be bypassed, so that the elevator can operate without the protection of some switches. Leaving the bypass in place after its use may result in failure of the equipment to operate properly and accidents, for example, the elevator can move while the doors are open, when the relevant circuits are left bypassed.

WO2011/090665 discloses an elevator tool and method for safely short circuiting an elevator switch. The elevator safety tool includes a control module that receives elevator operating status data and determines whether an elevator operating status is normal or service. A relay includes a switch that is movable from a close to an open position when the elevator operating status changes from service to normal. The tool may also include a pair of pen heads connected to the relay by short stubs. The method includes receiving data, determine elevator operating status based on the data, closing a switch to allow conduction between two pen heads when the elevator operating status is determined to be service, and opening the switch when the elevator operating status is determine by normal.

U.S. Pat. No. 5,443,142 discloses, An automatic elevator system having car movement controls, door controls, a door operating mechanism for automatically opening and closing at least the car door and first switch contacts operable when the car and hoistway doors are closed to permit the car to move from a floor in combination with further switch contacts which are operable in accordance with the positions of the doors and which prevent the car from moving from a floor when the first switch contacts are operated before the further switch contacts to prevent movement of the car from a floor when the first switch contacts have been operated or shunted by unauthorized persons or by a short circuit and other means to protect against failures of other circuits operated by the first switch means and further switch means.

One object of the present invention is to provide a simple system for safely bypass an elevator safety circuit by switching the elevator into inspection mode of operation with relatively simple changes in a conventional automatic elevator system and protect the elevator against bypass of elevator safety devices.

SUMMARY OF THE INVENTION

The present invention relates to elevator safety circuit bypass and more particularly a system for preventing accidents resultant from elevator safety circuit bypass.

In accordance with an embodiment of the present invention there is provided an electrical safety circuit powered by an electrical power supply at point A terminal. The safety circuit includes a plurality of switches serially connected to one another. The serially connected switches have a first and second ends, the first end is connected serially to the power supply and the second end is serially connected to a safety circuit bypass detector having two ends, one end of said safety circuit bypass detector is connected serially to the second end of the serially connected switches and the second end of the safety circuit bypass detector is connected to a point B terminal. The B terminal is connected to an electrical load. The safety circuit bypass detector identifies bypass between the point A terminal and the point B terminal. An SX terminal from the short circuiting detector transfers an electric signal that notify about the bypass.

In accordance with another embodiment of the present invention there is provided, a conventional automatic elevator system having an elevator car with a car door, means mounting the car in a hoistway extending between a plurality of floors in a building. A floor door at each of the floors for providing access to said car, control means including hoistway apparatus for moving the car from one of the floors to another and stopping the car at a floor. The convention elevator system further have a door operating means for automatically opening and closing at least the car door when the car is at a floor. The elevator further have a plurality of switches on the car and at the floors which are serially connected to each other and which, when all the doors are closed and locked, permit operation of the circuits in the control means which cause the car to move. Included in such plurality of switches are, a switch at each floor controlled in accordance with the position of the car door and operated by the locking mechanisms which hold the doors closed until the locking mechanisms are automatically released when the car is at a floor. An electrical safety circuit powered by an electrical power supply at point A terminal, the safety circuit includes, a plurality of switches serially connected to one another. The serially connected switches have a first and second ends, the first end is connected serially to the power supply, wherein the improvement of said elevator comprises:

An elevator safety circuit bypass detector having two ends, one end of the elevator bypass safety circuit detector is connected serially to the second end of the serially connected switches and the second end of the elevator safety circuit bypass detector is connected to a point B terminal, the B terminal is connected to an elevator electrical load. The elevator safety circuit bypass detector identifies a bypass between the point A terminal and the point B terminal. An SX terminal from the short circuiting detector transfers an electric signal that notify about the bypass.

In another embodiment of the present invention wherein the signal from said SX terminal that notifies about a temporary bypass between point A terminal and point B terminal is provided for sound and display alerting.

In yet another embodiment of the present invention, the signal from the SX terminal is utilized to prevent the elevator from working in a normal operation mode.

In yet another embodiment of the present invention, the elevator safety circuit bypass detector identifies if the safety circuit malfunction was repaired.

BRIEF DESCRIPTION OF THE DRAWINGS

The invention may be understood upon reading of the following detailed description of non-limiting exemplary embodiments thereof, with reference to the following drawings, in which.

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF EMBODIMENTS OF THE INVENTION

Figure 1:
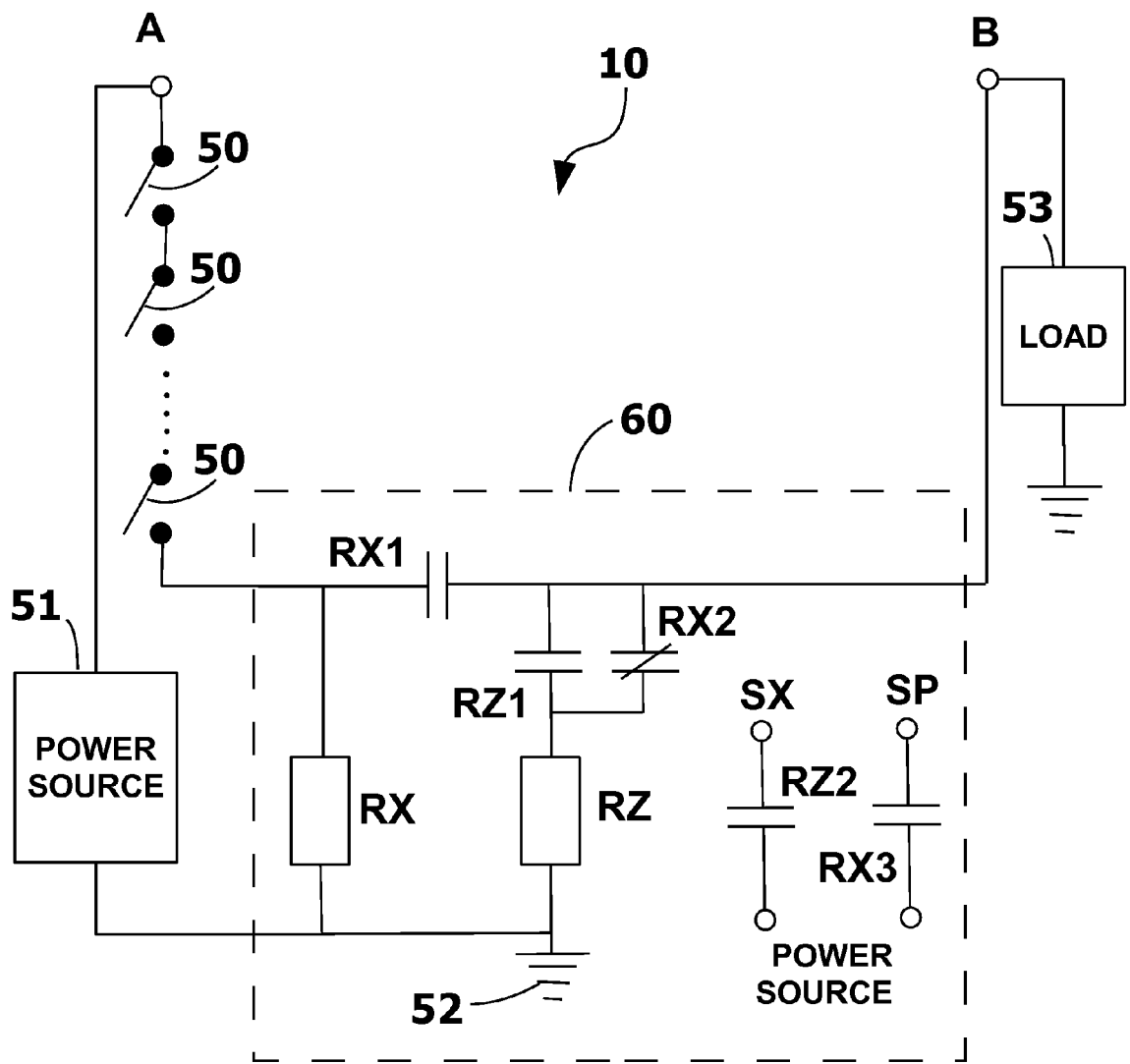
FIG. 1 is a schematic diagram of the preferred embodiment of the present invention for use in connection with elevator systems.

Referring first to FIG. 1, there is shown a schematic diagram 10 of the preferred embodiment of the present invention for use in connection with conventional elevator systems. A conventional elevator system includes a plurality of switches 50 which are part of the elevator safety circuit or section of the elevator safety circuit such as the landing door (not shown) and car doors (not shown) switches which are connected serially to a control means (not shown). When all the switches 50 such as the elevator doors switches are closed and locked, permit operation of the circuits in the control means which cause the car to move. Usually included in such plurality of switches 50 are a switch at each floor controlled in accordance with the position of the car door and operated by a locking mechanisms which hold the doors closed until the locking mechanisms are automatically released when the car is at a floor. In a conventional elevator all the switches 50 are connected in series as illustrated schematically in FIG. 1. In normal operation of a conventional elevator, all of the switches 50 need to operated in a close position for the elevator to be able to move. An elevator safety circuit bypass detector 60 in accordance with some embodiments of the present invention is connected serially to the switches 50. The elevator safety circuit bypass detector 60 includes a switching device RX with a normally open contact RX1 and a normally close contact RX2. An elevator safety circuit bypass detector 60 further includes a switching device RZ with a normally open contact RZ1 and a normally open contact RZ2. Switching devices RX and RZ are automatically energized or de-energized and may be any suitable switching devices known in the art for operating contacts such as contacts RX1, RX2, RX3 RZ1 and RZ2. For example, the switching devices RX and RZ could be relays or transistor switching circuits. In some embodiments of the present invention a microcontroller may replace the switching devices for operating contacts RX1, RX2, RX3, RZ1 and RZ2.

Operation:

In the event that normal operation mode of the conventional elevator, switches 50 and/or landing door interlock switches used therewith are operating properly and bypassed thereof is prevented or not in used, switches 50 are operated to close position. Thereby, in accordance with the present invention switching device RX is energized for example by a power source 51 connected to point A in respect to ground 52, causing closing of the normally open contact RX1 and opening of the normally closed contact RX2. Whereby, the elevator controller, not shown, receives a signal for example from point B in respect to ground 52 that all of the safety switches are in closed state for operating an electrical load 53 for example, allowing moving the elevator car from one of the floors to another, not shown. As mentioned above, in this event, switching device, RX is energized causing also the normally close contact, RX2 to open and thus, switching device RZ is prevented from being energized since normally open contact RZ1 and normally closed contact RX2 are in open state.

In the event that one or more of the switches 50 are malfunction, for example switches 50 cannot be operated in a close state. Thereby, in accordance with the present invention switching devices RX and RZ are in off state (not—energized) causing contacts RX1 and RZ1 to be in open state. Whereby, the elevator controller, not shown, does not receive the signal for example from point B in respect to ground 52 that all of the safety switches and interlocks are closed. Thus, for safety reasons the elevator controller does not allow the elevator to move. Contact RZ2 in this event is in open state thus, the elevator controller does not receive a signal from terminal SX.

Figure 2:
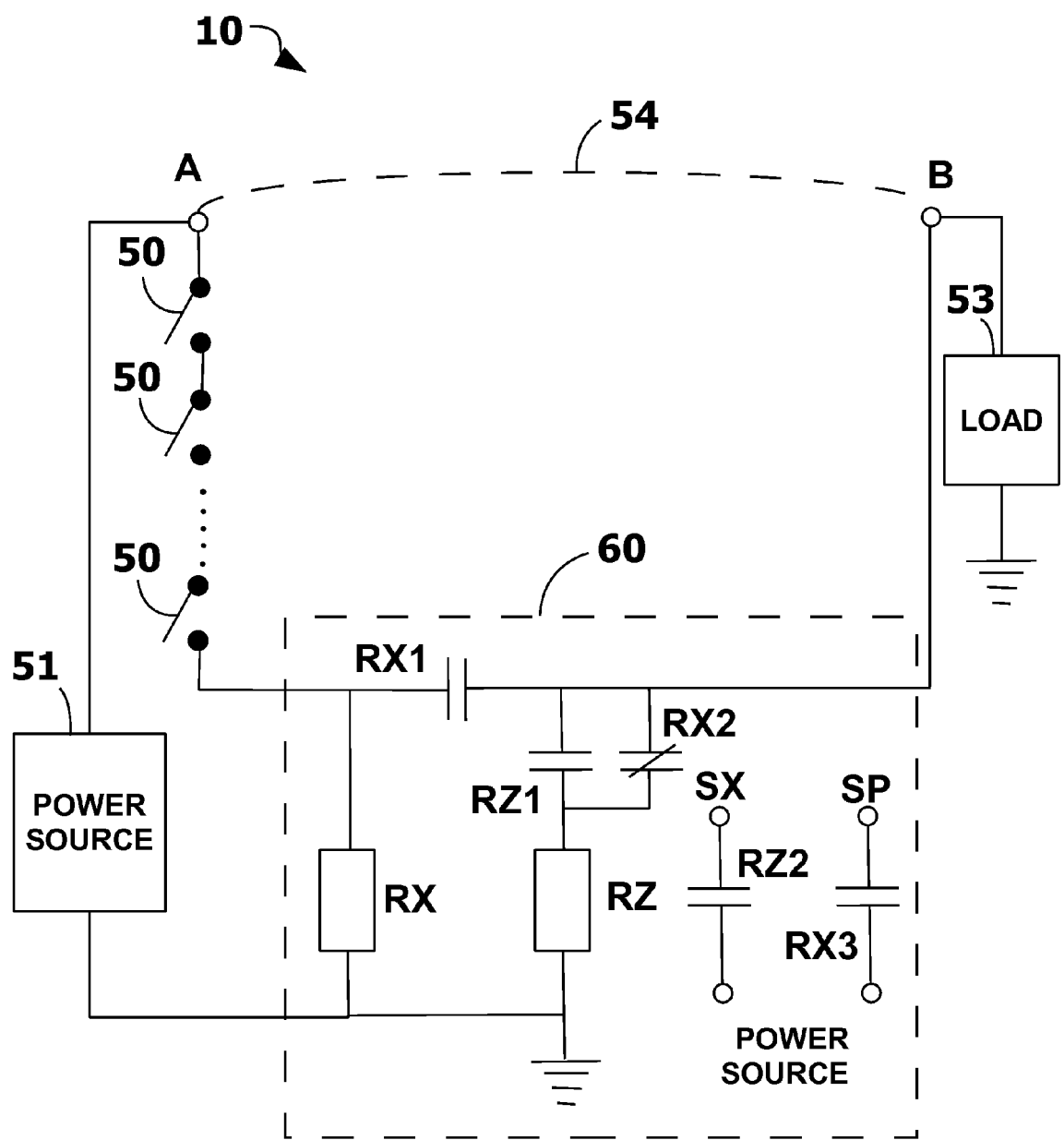
FIG. 2 is a schematic diagram of the preferred embodiment of the present invention for use in connection with elevator systems as describe in FIG. 1 wherein point A terminal is short circuited with point B terminal.

In the event that one or more of the switches 50 are malfunction and it is necessary to move the elevator car, the elevator mechanics needs to temporary bypass the safety circuit by electrically connecting point A to point B. This event is illustrated in FIG. 2, point A is electrically connected to point B, thereby the switches 50 and/or interlocks are bypassed and the elevator controller receives the signal from power supply 51, for allowing the elevator to move. In FIG. 2 the temporary safety circuit bypass is designated with a dashed line 54. Thereby, switching device RZ is energized facilitated by the normally closed contact, RX2 of switching device RX that is in close state. The energized switching device RZ, causes normally open contacts RZ1 and RZ2 to both operate in a close state. Switching device RZ causes contact RZ2 to be in a close state and the signal generated for example from the power source is received in the elevator controller from SX terminal.

The signal that comes from terminal SX to the controller will cause the controller to operate the elevator in service/inspection operation mode or to prevent the elevator for operating in normal operation mode.

In the event that one or more of the switches 50 and/or interlocks that were malfunction have been repaired and the temporary electrical bypass connection between point A and point B is still in place, RX is energized causing normally open contact RX1 to close and normally close contact RX2 to open. RZ switching device is still energized by utilizing the RZ1 contact that remains in a close state. RZ2 also remains in a close state, thereby the elevator controller still receive the signal that comes from terminal SX and will still cause the elevator controller to operate the elevator in service/inspection operation mode or to prevent the elevator for operating in normal operation mode.

In some embodiments of the present invention when RX switching device is energized it will cause also the activation of normally open contact RX3 for notifying the elevator mechanics that the elevator malfunction was repaired and all switches 50 are now in a close state. The notification can be by a light emitted diode (LED), not shown, connected to terminal SP and operates when a signal that comes from the power source is received from terminal SP.

Referring now to FIG. 1, in the event that the elevator malfunction was fixed and the mechanics remember to remove the bypass short circuiting 54, switching devices RZ and RX are still energized through contacts RZ1 and RX1. In order to restore the elevator to its normal operation mode after the remove of the temporary safety circuit bypass 54 all that is needed to do is to open at least one of the switches 50 and/or interlocks for example, by opening the elevator car or landing door. When at least one of the switches 50 are open, switching devices RX and RZ are de-energized thus, contact RZ returns to its normal open position, the electrical line from power supply to terminal SX and SP is disconnected and the elevator controller stop receiving the signal from terminals SX and SP allowing the elevator controller restore the elevator to the normal operation mode.

In the event that may occur when all of the switches 50 are closed and a bypass 54 is conducted, the elevator safety circuit bypass detector 60 may not detect the bypass 54. For example, if after the bypassing, one or more of the switches 50 are open, the elevator safety circuit bypass detector 60 may not detect that there is still exist bypass 54 and thus the elevator car may operate and move. This is an unwanted event that happens for the following reason, when all switches 50 are closed switching device RX is energized, hence switching device RZ remains unenergized because of normally closed contact RX2 that becomes open by switching device RX operation. Conducting a bypass 54 will not change RX and RZ status. When opening one or more of safety switches 50, RX and RZ status remain in the same status position, this happens because switching device RX remains energized utilizing contact RX1 powered from point B, thus switching device RZ remains unenergized preventing detection of bypass 54 from point A to Point B.

Figure 3:
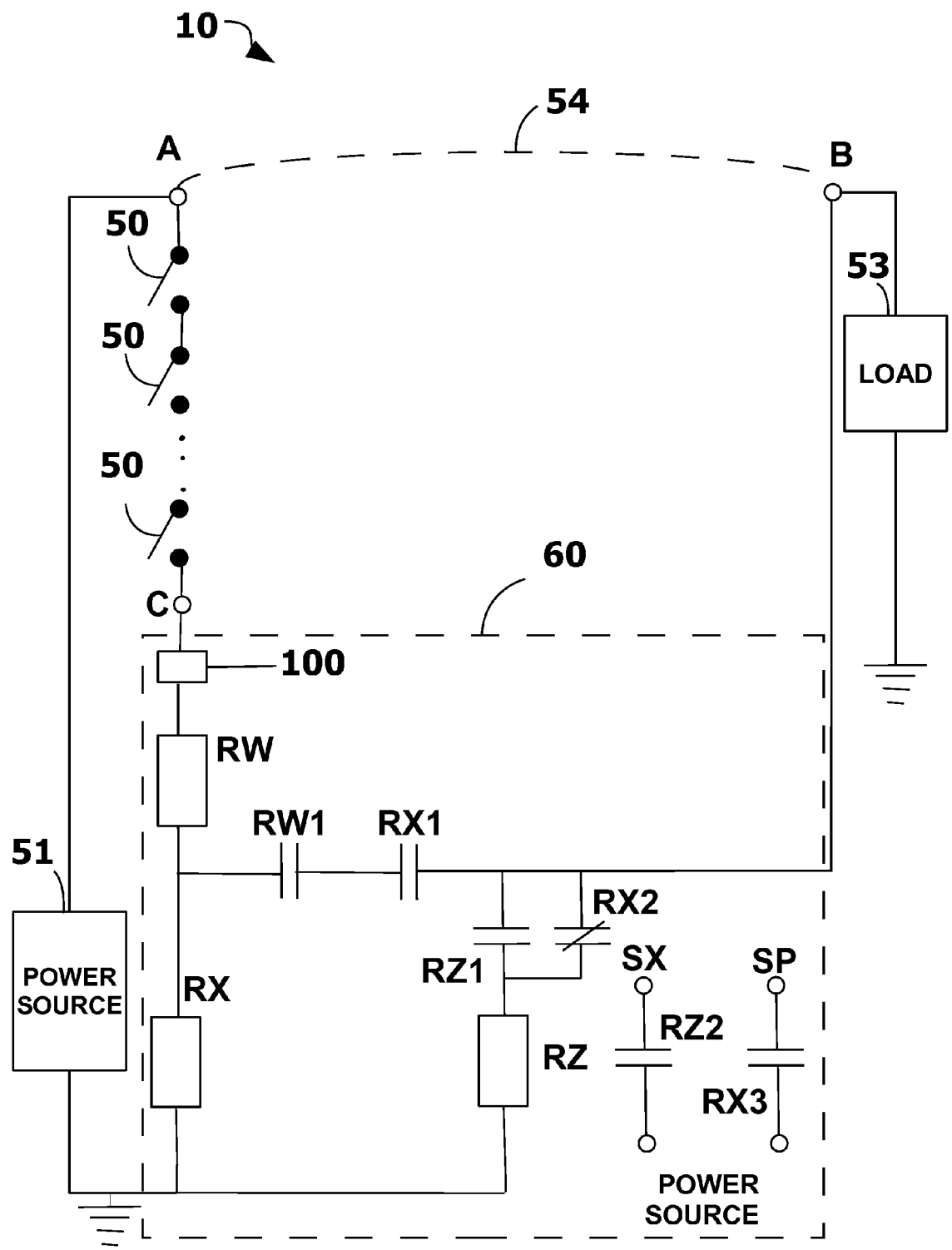
FIG. 3 is a schematic diagram as illustrated in FIG. 2 including additional electrical components for detecting the short circuiting between point A and B in an AC circuitry.
Figure 4:
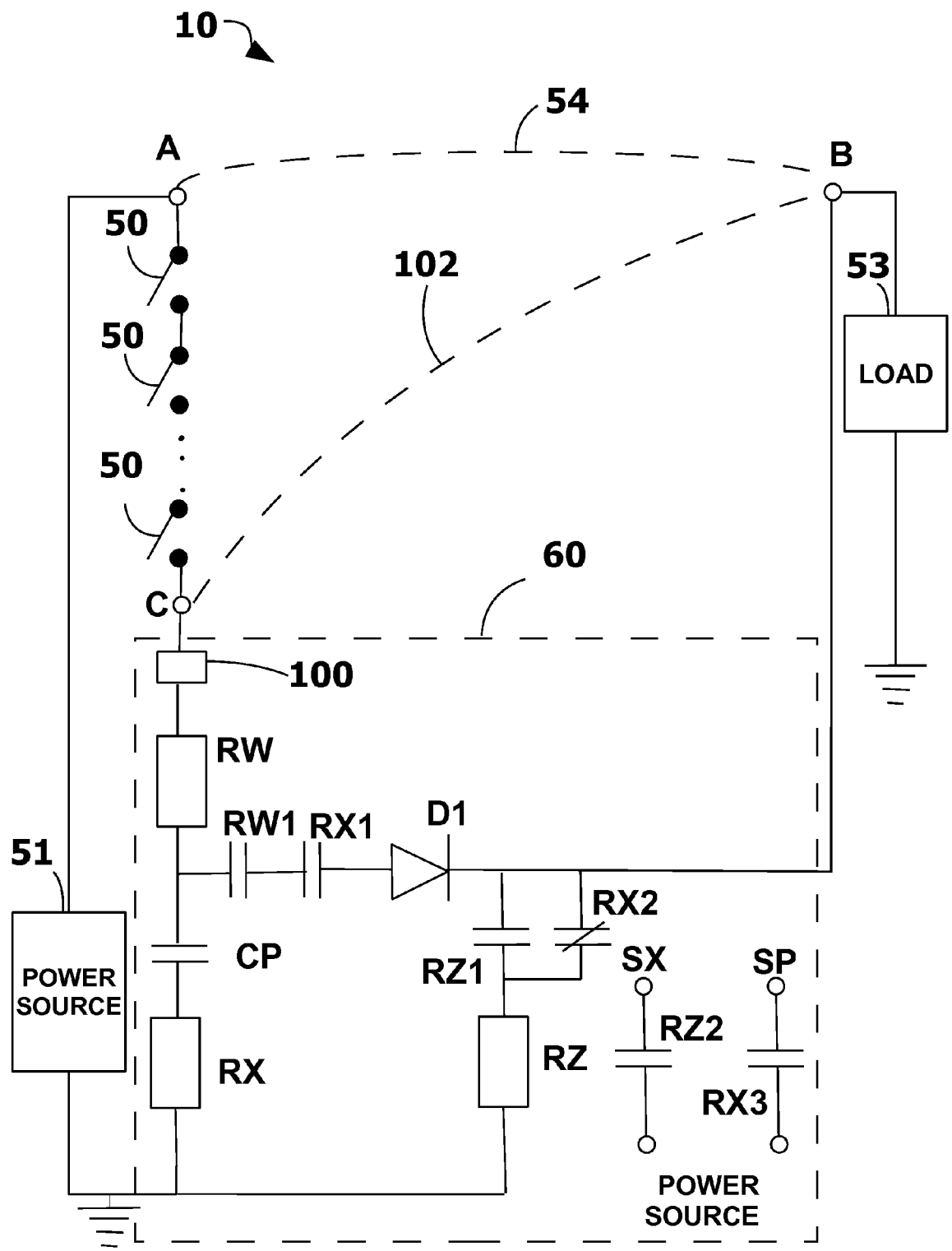
FIG. 4 is a schematic diagram as illustrated in FIG. 2 including additional electrical components for detecting the short circuiting between point A and B in a DC circuitry, and a means for detecting short circuiting of safety circuit bypass detector.

Referring now to FIG. 3 and FIG. 4, each figure demonstrates a different example to resolve the problem described above. However, in order to overcome the aforementioned unwanted event that prevents bypass detection, these two examples should not limit to the various different ways to resolve the problem.

In FIG. 3 In order to overcome this aforementioned unwanted event, bypass circuit detector 60 further includes a switching device RW and a unidirectional current detector 100. Switching device RW is energized by current detector 100 only when a current is detected by current detector 100 which may happens when all of the switches 50 are closed. Any other suitable sensor or detector can be used for detecting that all of the safety switches are closed and if current flows or not from point C. Contact RW1 must be in the close position to allow the elevator to operate in normal operation throughout switches 50. This configuration resolve the problem of the unwanted event described above. When conducting bypass 54 while all of the switches 50 are close, opening at least one safety switch 50 will force switching device RW to switch to the OFF position, this will force switching device RX also to the OFF position, thereby allowing switch RZ to energize for detecting the bypass 54.

Referring now to FIG. 4, circuit 60 includes an electrical component, D1, which allows electrical current to flow in one direction. When conducting bypass 54 when all of the switches 50 are close, if afterwards at least one switch 50 is opened, the presence of D1 will cause switch RX to be in the OFF position, thus allows RZ to energize for detecting bypass 54.

Referring to FIG. 4 in the figure there is also shown a means to protect against an attempt to disable the bypass detector 60 for example by electrical shorting 102 between point C and B. There might be a situation when someone wants to disable bypass detector 60, utilizing a simple jumper wire to connect between point C and point B. This will disable bypass detector 60 and thus bypass detector 60 will not be able to detect any bypass of switches 50. In order to detect electrical shorting of bypass detector 60 a voltage delay element CP, is serially connected to switching device RX. Delay element CP will cause a short voltage delay before RX is energized. Delay element CP can be done by several ways for example by utilizing a capacitor serially connected to RX, thus When connecting point C to point B, (an attempt to disable bypass detector 60), when closing switches 50, RZ will be energized before RX hence detecting the attempt to disable bypass detector 60.

The current invention has the ability to detect the direction of current flow in the circuit 10, either from point A into bypass detector 60 or from point B into bypass detector 60. The current invention can be used not only for elevator safety circuit; it can be used also for any system that has a switch or switches subject to bypass intentionally or unintentionally, or plurality of switches connected in series which are part of the electrical safety circuit of the system.

In some embodiments of the present invention a plurality of the elevator bypass detectors can be connected between sections of the plurality of switches and/or interlocks to identify a short circuiting between at least one of these sections. Each of the elevator bypass detectors can send a signal through SX terminal to notify the elevator controller about bypass in one or more of these section(s).

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. An electrical safety circuit powered by an electrical power supply at point A terminal, said safety circuit comprising:
    a plurality of switches serially connected to one another, each one of said serially connected switches having a first end and a second end, wherein the first end of each one of said plurality of switches is connected to said electrical power supply and the second end of each one of said plurality of switches is connected to a safety circuit bypass detector having two ends, one end of said safety circuit bypass detector being connected to the second end of each one of said plurality of switches and the second end of said safety circuit bypass detector being connected to a point B terminal which is connected to an electrical load;
    said safety circuit bypass detector having a switching device RX with a normally open contact RX1 and a normally closed contact RX2, and a switching device RZ with a normally open contact RZ1 and a normally open contact RZ2;
    wherein, in normal operation when said plurality of switches are operated in a closed position, switching device RX is energized causing closing of the normally open contact RX1 and opening of the normally closed contact RX2, and switching device RZ is prevented from being energized since normally open contact RZ1 and normally closed contact RX2 are in their open states, whereby an electrical signal can be transmitted to said electrical load so as to move said electrical load; and
    wherein, in the event that at least one of said plurality of serially connected switches malfunctions, switching devices RX and RZ are disposed in off states causing contacts RX1 and RZ1 to be disposed in open states, whereby a signal is not transferred from said point B terminal to said electrical load, contact RZ2 in this event is disposed in its open state and thus, an electrical load controller does not receive a signal from a terminal SX such that the electrical load is not moved.

2. An electrical safety circuit in accordance with claim 1, wherein:
    in the event that at least one of said plurality of serially connected switches malfunctions and it is necessary to operate said electrical load, said safety circuit is temporarily bypassed by electrically connecting said point A terminal to said point B terminal whereby said plurality of serially connected switches are bypassed and a signal is transmitted from said power supply for allowing said electrical load to operate; switching device RZ is energized as facilitated by the normally closed contact RX2 of switching device RX that is in its closed state; the energized switching device RZ causes normally open contacts RZ1 and RZ2 to both operate in a closed state; and switching device RZ causes contact RZ2 to be in a closed state whereby the signal generated from said power source, and received by said SX terminal can be transmitted to said electrical load controller.

3. An electrical safety circuit in accordance with claim 2, wherein:
    the signal that comes from said terminal SX is sent to said electrical load controller for automatically operating said electrical load from its normal operation mode to a service/inspection operation mode and to prevent said electrical load from operating in its normal operation mode.

4. An electrical safety circuit in accordance with claim 3, wherein:
    in the event that one or more of said plurality of serially connected switches that malfunctioned have been repaired and the temporary electrical bypass connection between point A terminal and point B terminal is still in place, said switching device RX is energized causing said normally open contact RX1 to close and said normally closed contact RX2 to open; said RZ switching device is still energized by utilizing said RZ1 contact that remains in a closed state; said RZ2 contact also remains in a closed state, whereby said electrical load controller still receives the signal that comes from said terminal SX and will still cause said controller to operate said electrical load in its service/inspection operation mode and prevents said electrical load from operating in its normal operation mode.

5. An electrical safety circuit in accordance with claim 4, wherein:
    when said RX switching device is energized, a normally open contact RX3 is activated for notifying that the malfunction of at least one of said plurality of serially connected switches has been repaired and all of said plurality of serially connected switches are now in closed states.

6. An electrical safety circuit in accordance with claim 5, wherein:
    said notification is in the form of a visual display connected to a terminal SP and operates when a signal, that comes from said power source, is received said terminal SP.

7. An electrical safety circuit in accordance with claim 4, wherein:
    in the event that said malfunction of said one or more of said plurality of serially connected switches has been fixed and said bypass short circuiting has been removed, said switching devices RZ and RX are still energized through said contacts RZ1 and RX1; and in order to restore said electrical load to its normal operation mode after the removal of the temporary safety circuit bypass, at least one of said plurality of serially connected switches is opened whereby at least one of said plurality of serially connected switches is now open, switching devices RX and RZ are de-energized, and thus, said contact RZ1 returns to its normally open position, the electrical line from said power supply to terminals SX and SP is disconnected, and said electrical load controller stops receiving signals from said terminals SX and SP thereby allowing said electrical load controller to automatically restore said electrical load to the normal operation mode.

8. An electrical safety circuit in accordance with claim 1, wherein:
    said signal from said SX terminal that indicates that a bypass between point A terminal and point B terminal has been provided is used for alerting service personnel.

9. An electrical safety circuit in accordance with claim 1, wherein:
    said switching devices RX and RZ are powered by said power source.

10. An electrical safety circuit in accordance with claim 1, wherein:
said switching devices RX and RZ are automatically energized and de-energized.

11. An automatic elevator system having an elevator car with a car door, means for mounting said car in a hoistway extending between a plurality of floors in a building, a floor door at each one of said floors for providing access to said car, control means including hoistway apparatus for moving said car from one of said plurality of floors to another one of said plurality of floors and for stopping said car at a particular one of said plurality of floors, door operating means for automatically opening and closing said car door when the elevator car is disposed at a particular one of said plurality of floors, a plurality of switches disposed on the car and upon each one of the plurality of floors which are serially connected to each other and which, when all of the doors are closed and locked, permit operation of circuits in the control means which cause the car to move, wherein included in such plurality of switches, is a switch, located at each floor and controlled in accordance with the position of the car door and operated by the locking mechanisms which hold the doors closed until the locking mechanisms are automatically released when the car is located at a floor, each one of said plurality of switches having a first end and a second end, said first ends of said plurality of switches being connected to an electrical power supply through a point A terminal, further comprising:
an elevator safety circuit bypass detector having two ends, one end of said elevator safety circuit bypass detector being connected to the second end of each one of said plurality of switches and the second end of said elevator safety circuit bypass detector being connected to a point B terminal which is connected to said elevator car; said safety circuit bypass detector having a switching device RX with a normally open contact RX1 and a normally closed contact RX2, a switching device RZ with a normally open contact RZ1 and a normally open contact RZ2;
wherein, in normal operation when said plurality of switches are operated in a closed position, switching device RX is energized causing closing of the normally open contact RX1 and opening of the normally closed contact RX2, and switching device RZ is prevented from being energized since normally open contact RZ1 and normally closed contact RX2 are in their open state, whereby an electrical signal can be transmitted to said elevator car so as to move said elevator car; and
wherein in the event that at least one of said plurality of serially connected switches malfunctions, switching devices RX and RZ are disposed in off states causing contacts RX1 and RZ1 to be in open states, whereby a signal is not transferred from said point B terminal to said elevator car, contact RZ2 in this event is disposed in its open state, and thus, said control means does not receive a signal from a terminal SX such that said elevator car is not moved.

12. An automatic elevator system in accordance with claim 11, wherein:
said elevator system automatically switches from elevator normal operation mode into elevator inspection/service mode.

13. An automatic elevator system in accordance with claim 11, wherein:
in the event that at least one of said plurality of serially connected switches malfunctions and it is necessary to operate said elevator car, said safety circuit is temporarily bypassed by electrically connecting said point A terminal to said point B terminal whereby said plurality of serially connected switches are bypassed and an electrical signal is transmitted from said power supply for allowing said elevator car to operate; switching device RZ is energized as facilitated by the normally closed contact RX2 of switching device RX that is in its closed state; the energized switching device RZ causes normally open contacts RZ1 and RZ2 to both operate in a closed state; and switching device RZ causes contact RZ2 to be in a closed state whereby the signal generated from said power source is received by said SX terminal for transmission to said elevator car control means.

14. An automatic elevator system in accordance with claim 12, wherein:
the signal that comes from said terminal SX is sent to said control means for automatically operating said electrical car in service/inspection operation mode and to prevent said load from operating in normal operation mode.

15. An automatic elevator system in accordance with claim 12, wherein:
in the event that one or more of said plurality of serially connected switches that malfunctioned have been repaired and the temporary electrical bypass connection between point A terminal and point B terminal is still in place, said switching device RX is energized causing said normally open contact RX1 to close and said normally closed contact RX2 to open; said RZ switching device is still energized by utilizing said RZ1 contact that remains in a closed state; said RZ2 contact also remains in a closed state, whereby said control means still receives the signal that comes from said terminal SX and will still cause said control means to operate said elevator car in its service/inspection operation mode and to prevent said elevator car from operating in normal operation mode.

16. An automatic elevator system in accordance with claim 13, wherein:
when said RX switching device is energized, a normally open contact RX3 is activated for notifying that the malfunction of at least one of said plurality of serially connected switches has been repaired and all of said plurality of serially connected switches are now in a closed state.

17. An automatic elevator system in accordance with claim 16, wherein:
said notification is in the form of a light emitted diode (LED), connected to a terminal SP and operates when a signal that comes from said power source is received by said terminal SP.

18. An automatic elevator system in accordance with claim 12, wherein:
said signal from said SX terminal that indicates that a bypass between point A terminal and point B terminal has been provided is used for alerting service personnel.

19. An automatic elevator system in accordance with claim 12, wherein:
said switching devices RX and RZ are powered by said power source.

20. An automatic elevator system in accordance with claim 12, wherein:
said switching devices RX and RZ are automatically energized and de-energized.

21. An automatic elevator system in accordance with claim 11, wherein
said bypass circuit detector further comprises a switching device RW, a current detector, and contact RW1, wherein switching device RW is energized by said current detector, and a current is detected by said current detector only when all of said plurality of switches are closed;

contact RW1 must be in the closed position so as to allow the elevator to operate in normal operation; and when conducting a bypass between point A terminal and point B terminal while all of said plurality of switches are at their closed positions, opening at least one of said plurality of switches will force switching device RW to be disposed at its OFF position thereby forcing switching device RX to be disposed at its OFF position whereby switch RZ will be energized so as to detect said bypass.

22. An automatic elevator system in accordance with claim 11, wherein:

said bypass circuit detector further comprises an electrical component D1 which allows electrical current to flow in one direction, wherein when conducting said bypass, when all of said plurality of switches are closed, if afterwards, at least one of said plurality of switches is opened, the presence of electrical component D1 will cause said switching device RX to be disposed at its OFF position thereby energizina switch RZ for detecting said bypass.

23. An automatic elevator system in accordance with claim 11, wherein:

a voltage delaying element is serially connected to said switching device RX for delaying energization of switching device RX and thereby alerting personnel against short circuiting of said safety circuit bypass detector.

24. An automatic elevator system in accordance with claim 11, wherein:

said safety circuit bypass detector detects the direction of current flow in said circuit, either from point A terminal into said bypass detector or from point B terminal into said bypass detector.

* * * * *